US010609055B2

(12) United States Patent
Shin et al.

(10) Patent No.: US 10,609,055 B2
(45) Date of Patent: Mar. 31, 2020

(54) METHOD FOR DETECTING NETWORK ANOMALY IN DISTRIBUTED SOFTWARE DEFINED NETWORKING ENVIRONMENT, APPARATUS THEREFOR, AND COMPUTER PROGRAM THEREFOR

(71) Applicant: Korea Advanced Institute of Science and Technology, Daejeon (KR)

(72) Inventors: Seungwon Shin, Daejeon (KR); Seunghyeon Lee, Daejeon (KR); Jinwoo Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 152 days.

(21) Appl. No.: 15/498,967

(22) Filed: Apr. 27, 2017

(65) Prior Publication Data
US 2017/0318043 A1 Nov. 2, 2017

(30) Foreign Application Priority Data
Apr. 27, 2016 (KR) .................. 10-2016-0051216

(51) Int. Cl.
*H04L 29/06* (2006.01)
*H04L 12/24* (2006.01)
(Continued)

(52) U.S. Cl.
CPC .......... *H04L 63/1425* (2013.01); *G06F 21/00* (2013.01); *G06F 21/552* (2013.01);
(Continued)

(58) Field of Classification Search
CPC . H04L 63/1425; H04L 41/20; H04L 41/0853; H04L 41/065; H04L 43/0888;
(Continued)

(56) References Cited

U.S. PATENT DOCUMENTS

| 2005/0108444 A1* | 5/2005 | Flauaus ............... H04L 41/0853 710/15 |
| 2006/0045111 A1* | 3/2006 | Sinha ..................... H04L 47/34 370/412 |

(Continued)

FOREIGN PATENT DOCUMENTS

| KR | 10-2014-0122171 A | 10/2014 |
| KR | 20140122171 A | * 10/2014 |
| KR | 10-2015-0095090 A | 8/2015 |

OTHER PUBLICATIONS

Monowar H. Bhuyan; et al., Network Anomaly Detection: Methods, Systems and Tools, Jun. 2013, IEEE Communications Surveys & Tutorials ( vol. 16 , Issue: 1 , First Quarter 2014 ), pp. 1-34.*

*Primary Examiner* — Lisa C Lewis
*Assistant Examiner* — Raied A Salman
(74) *Attorney, Agent, or Firm* — Masuvalley & Partners

(57) ABSTRACT

A method, an apparatus, and a computer program for detecting network anomaly in a distributed software defined networking (SDN) environment. The method includes collecting a control message from a distributed SDN controller and generating network characteristic information using the control message. The network characteristic information includes statistic information or event information included in the control message, new calculation information calculated using the statistic information or the event information, and network stateful information. The method, the apparatus, and the computer program for detecting network anomaly have high utilization, scalability, availability, and distribution properties to a user by supporting a variety of functions for detecting network anomaly in the SDN environment and providing a high-level API to the user.

5 Claims, 8 Drawing Sheets

(51) Int. Cl.
*G06F 21/00* (2013.01)
*G06F 21/55* (2013.01)

(52) U.S. Cl.
CPC ............ *H04L 41/142* (2013.01); *H04L 41/20* (2013.01); *H04L 41/22* (2013.01); *H04L 41/5009* (2013.01)

(58) Field of Classification Search
CPC .... H04L 43/0823; H04L 43/065; G06F 11/30; G06F 21/00; G06F 21/552; G06F 41/142
USPC ............................................ 726/23; 709/224
See application file for complete search history.

(56) References Cited

U.S. PATENT DOCUMENTS

| | | | |
|---|---|---|---|
| 2006/0047807 A1* | 3/2006 | Magnaghi | H04L 41/0677 709/224 |
| 2007/0025258 A1* | 2/2007 | Chen | H04L 43/0882 370/241 |
| 2012/0151593 A1* | 6/2012 | Kang | H04L 41/142 726/25 |
| 2016/0112269 A1* | 4/2016 | Singh | H04L 41/0853 709/224 |
| 2016/0218949 A1* | 7/2016 | Dasgupta | H04L 63/1416 |
| 2016/0241435 A1* | 8/2016 | Iordache | H04L 41/0823 |
| 2017/0054609 A1* | 2/2017 | Chetan | H04L 43/022 |
| 2017/0118240 A1* | 4/2017 | Devi Reddy | G06N 7/005 |

\* cited by examiner

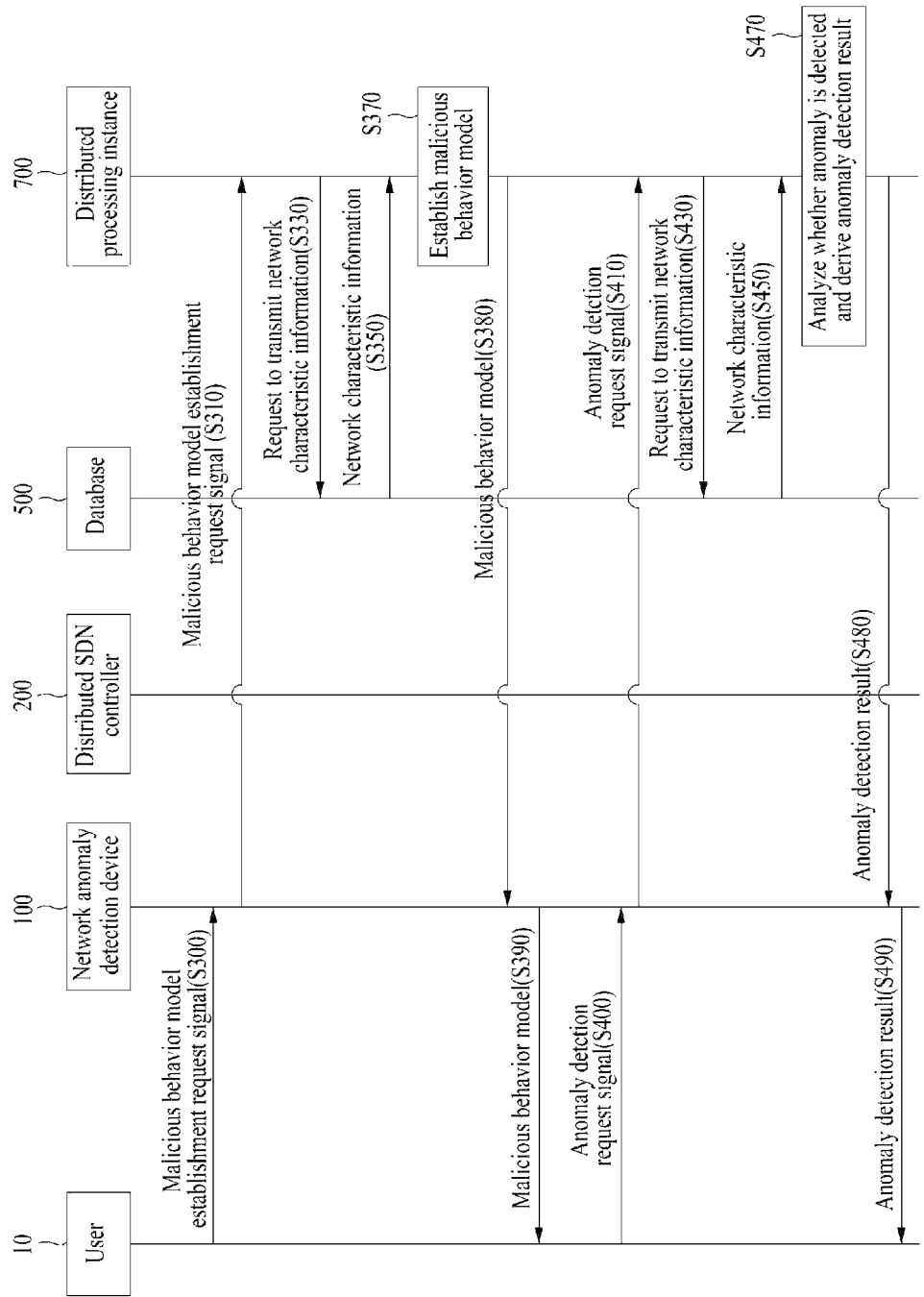

METHOD FOR DETECTING NETWORK
ANOMALY IN DISTRIBUTED SOFTWARE
DEFINED NETWORKING ENVIRONMENT,
APPARATUS THEREFOR, AND COMPUTER
PROGRAM THEREFOR

CROSS-REFERENCE TO RELATED APPLICATIONS

A claim for priority under 35 U.S.C. § 119 is made to Korean Patent Application No. 10-2016-0051216 filed Apr. 27, 2016, in the Korean Intellectual Property Office, the entire contents of which are hereby incorporated by reference.

BACKGROUND

Embodiments of the inventive concept described herein relate to a method for detecting network anomaly, an apparatus therefor, and a computer program therefor, and more particularly, relate to a method for detecting network anomaly in a distributed software defined networking (SDN) environment, an apparatus therefor, and a computer program therefor.

SDN has been a new paradigm of separating a data transmission function and a control function of conventional network equipment such that a central controller controls a network and has become more attractive in a network field. In the SDN, information about the entire network may be maintained based on information collected from a plurality of network equipment by a central SDN controller, and a variety of network services may be provided based on the information.

Communication between a controller which is responsible for a control plane and a switch which is responsible for a data plane in the SDN may be performed through an OpenFlow protocol which is an international standard. If receiving a packet, the switch which supports the OpenFlow protocol may perform a simple operation of transmitting the packet to another switch or the controller or discarding the packet according to a rule predefined by the controller.

In the SDN, a function of each network switch or router may be dynamically set in an environment such as a cloud network to reduce energy consumption and a desired access control scheme may be implemented in each switch or router in an enterprise network environment. Further, in the SDN, the number of equipment used in a conventional network and the cost of managing equipment may be reduced using each switch or router. Further, the SDN may support to freely test a newly developed function in a network environment.

Meanwhile, there is a fatal single point of failure problem in which the entire network is down upon occurrence of a controller fault in a structure of controlling the entire network at a single SDN controller. Further, there is an issue for scalability because processing capacity of the single SDN controller is limited.

Therefore, to address this issue, research and development have been conducted for a distributed SDN controller structure of configuring a cluster using a plurality of SDN controllers and providing high availability and high scalability. In this case, the distributed SDN controller structure should be able to detect network anomaly although a large-scale network data set is used and should be able to support a variety of networks. Further, the distributed SDN controller structure should be able to provide an application programming interface (API) changeable as much as a user wants, a high-level script, or the like to detect various attacks.

However, since only a limited network function (feature) for only a specific attack scenario may be defined in conventional research, it is insufficient to detect a variety of symptoms. Further, it may be impossible to distribute a framework, such as OpenSketch, implemented by customizing a switch in an OpenFlow based environment.

SUMMARY

Embodiments of the inventive concept provide a method for enhancing scalability and availability of a network anomaly detection framework by allowing a user to easily verify and analyze a large amount of network status data collected in a distributed SDN environment, an apparatus therefor, and a computer program therefor.

Embodiments of the inventive concept provide a method for increasing utilization by supporting various network functions as compared with the related art and providing a high level API to a user, an apparatus therefor, and a computer program therefor.

Embodiments of the inventive concept provide a method for having high distribution properties by providing a network function which may use an OpenFlow without change without customizing a switch, an apparatus therefor, and a computer program therefor.

Embodiments of the inventive concept provide a method for using abnormal activity detection characteristic information suitable for each attack by deriving various types of network characteristic information necessary for detecting an abnormal activity in a conventional OpenFlow environment, an apparatus therefor, and a computer program therefor.

Embodiments of the inventive concept provide a method for ensuring scalability in a large-scale network by configuring a fully-distributed architecture of constructing functions, such as an anomaly detection algorithm, a storage, and collection of network characteristic information, necessary for an abnormal activity as a distributed environment, an apparatus therefor, and a computer program therefor.

According to an aspect of an embodiment, a method for detecting a network anomaly in a distributed software defined networking (SDN) environment may include receiving an operation signal about whether to perform any function from a user, collecting a control message from a distributed SDN controller, generating network characteristic information using the control message, and providing a network analysis result corresponding to the operation signal using the network characteristic information. The network characteristic information may include statistic information or event information included in the control message, new calculation information calculated using the statistic information or the event information, and network stateful information.

According to another aspect of an embodiment, an apparatus for detecting a network anomaly in a distributed SDN environment may include an application unit configured to receive an operation signal about whether to perform any function from a user, a communication unit configured to collect a control message from a distributed SDN controller, and a controller configured to generate network characteristic information using the control message and provide a network analysis result corresponding to the operation signal using the network characteristic information. The application unit provides the network analysis result to the user. The network characteristic information may include statistic information or event information included in the control message, new calculation information calculated using the statistic information or the event information, and network stateful information.

According to another aspect of an embodiment, a computer program stored in a medium to detect a network anomaly in a distributed SDN environment may include receiving an operation signal about whether to perform any function from a user, collecting a control message from a distributed SDN controller, generating network characteristic information using the control message, and providing a network analysis result corresponding to the operation signal using the network characteristic information. The network characteristic information may include statistic information or event information included in the control message, new calculation information calculated using the statistic information or the event information, and network stateful information.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 6 is a signal sequence diagram illustrating a network anomaly detection method according to another embodiment.

DETAILED DESCRIPTION

Figure 1A:
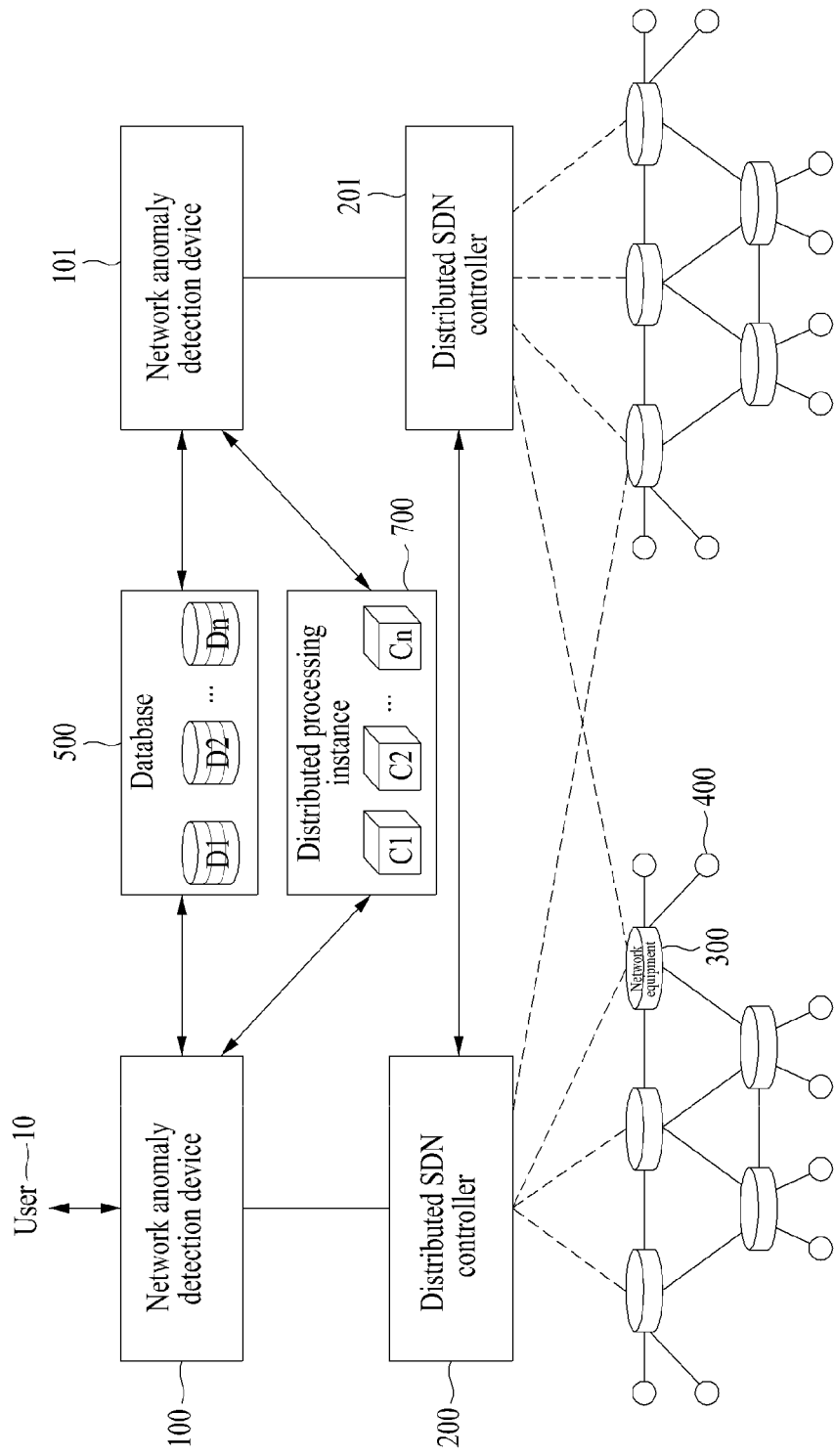
FIGS. 1A and 1B are drawings illustrating a distributed software defined networking (SDN) environment according to an embodiment.

The above-mentioned purposes, features, and advantages will be described in detail with reference to the accompanying drawings. Therefore, those skilled in the art may easily implement the scope and spirit of the inventive concept. In describing the inventive concept, if it is determined that a detailed description of well-known technology associated with the inventive concept may blurs the gist of the inventive concept, the detailed description will be omitted. Hereinafter, a detailed description will be given of exemplary embodiments of the inventive concept with reference to the accompanying drawings. In the drawings, the same reference denotations may be used to indicate the same or similar elements.

It should be understood to those skilled in the art that a flow in the specification refers to a set of packets passing through a specified viewing point on a network during a specific time and refers to data having information such as a source or destination of packets.

Figure 1B:
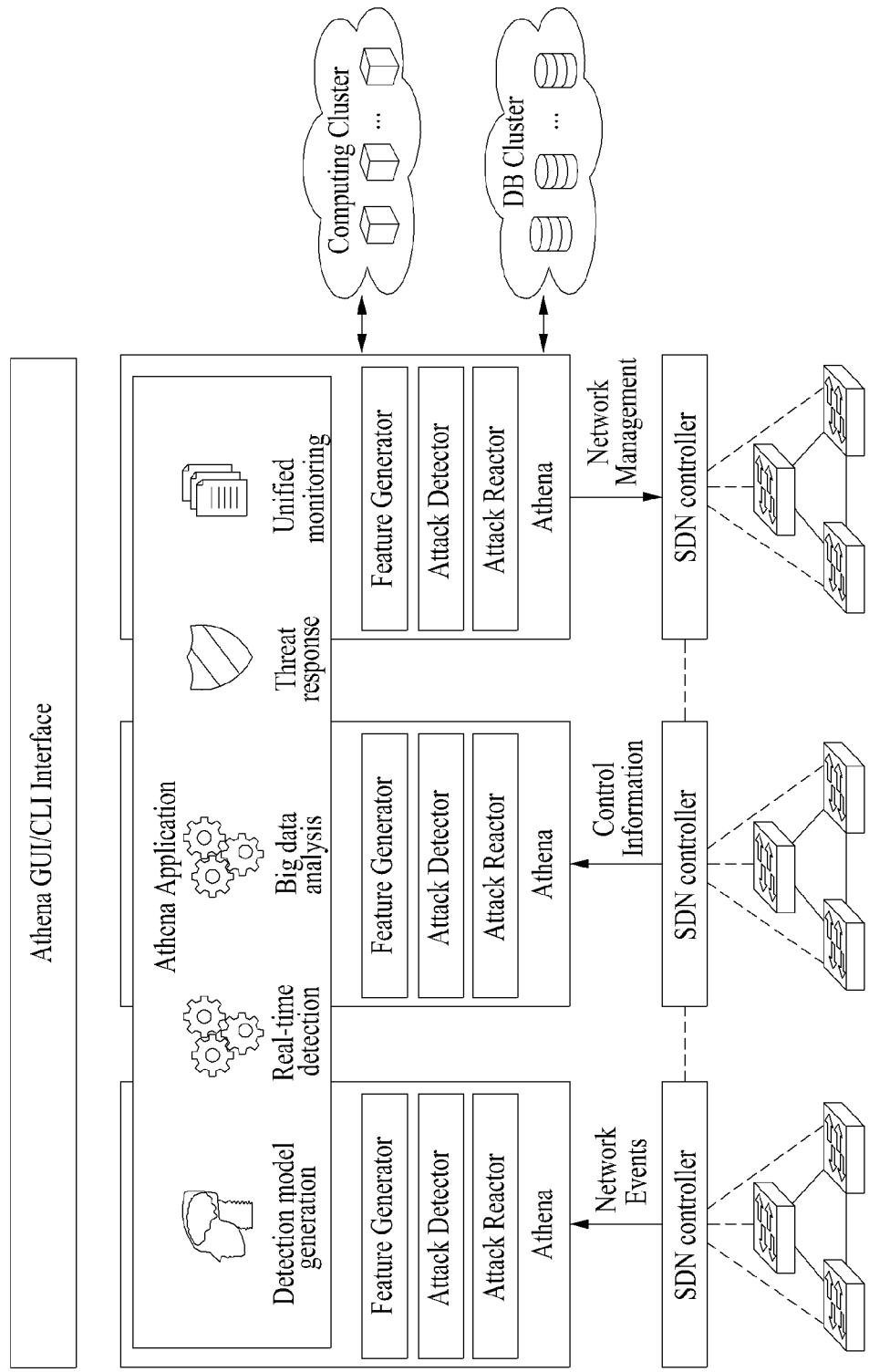

FIGS. 1A and 1B are drawings illustrating a distributed software defined networking (SDN) environment and a network anomaly detection device according to an embodiment. In detail, FIG. 1A is a drawing illustrating a distributed SDN environment and a network anomaly detection device. FIG. 1B is an exemplary conceptual drawing implementing a distributed SDN environment and a network anomaly detection device of FIG. 1A.

Referring to FIG. 1A, the distributed SDN environment according to an embodiment may include network anomaly detection devices 100 and 101, distributed SDN controllers 200 and 201, network equipment 300, a host 400, a database 500, a distributed processing instance 700. Each of the network equipment 300 and the host 400 may be referred to as a node, and a link may refer to a connection between two nodes.

Distributed SDN may have a difference with SDN in that a distributed controller (or a multi-controller) environment may be provided to a plurality of servers or clusters and in that a computer load of the distributed SDN controllers 200 and 201 may be distributed. However, the distributed SDN may be the same as the SDN in that the distributed SDN controller 200 performs a function of managing and controlling the plurality of network equipment 300 in a centralized manner in the distributed SDN environment. Therefore, hereinafter, a description will be given of a signal transmitted and received between the distributed SDN controller 200 and the network equipment 300 based on an OpenFlow protocol.

Meanwhile, if a distributed SDN structure is divided into an application layer, a control layer, and an infrastructure layer, it may be shown that the distributed SDN controllers 200 and 201, the database 500, and the distributed processing instance 700 may be included in the control layer.

In this case, each of the network anomaly detection devices 100 and 101 may provide only information a user needs to him or her by communicating with the control layer and the infrastructure layer to allow him or her to easily manage a network through the application layer and verify network information. In other words, each of the network anomaly detection devices 100 and 101 may be shown as a kind of framework which provides a northbound application program interface (API) to the application layer and provides a southbound API to the control layer and the infrastructure layer. Particularly, each of the network anomaly detection devices 100 and 101 may provide an API for detecting only an abnormal activity.

The distributed SDN controller 200 may be implemented in the form of loading software which performs a function such as a topology management, a path management associated with processing a packet, link discovery, or flow management which is a packet flow. For convenience of description, it is noted that a controller and a distributed SDN controller may be interchangeably used with each other.

The network equipment 300 may process a packet based on control of the controller 200. The network equipment 300 may be, for example, a base transceiver station (BTS), a base station controller (BSC), gateway equipment, a switch of a wired network, a router, or the like. Herein, for convenience of description, a description will be given of an example in which the network equipment 300 is an OpenFlow switch.

The controller 200 and the OpenFlow switch 300 should transmit and receive information with each other in the SDN, and an OpenFlow protocol may be widely used as a protocol for transmitting and receiving the information between the controller 200 and the OpenFlow switch 300. In other words, the OpenFlow protocol may be standards for communicating with each other between the controller 200 and the OpenFlow switch 300.

Specifically, the OpenFlow switch 300 may exchange information with the controller 200 over a secure channel. The secure channel may be a communication channel between the OpenFlow switch 300 and the controller 200 located at a long distance. The information exchanged between the controller 200 and the OpenFlow switch 300 may be encrypted.

There are one or more flow tables, which specify and process a packet and include statistic information associated with the packet, in the OpenFlow switch 300. The flow table may be configured with a flow entry (or a flow rule) which specifies packet processing. The flow entry may be added, corrected, or deleted by a flow-mod message which is generated and transmitted to the OpenFlow switch 300 by the controller 200. The OpenFlow switch 300 may process a packet with reference to the flow table.

The flow entry may include match information (or a match field) about a packet which defines a flow, operation information (or an instruction) for defining processing of the packet, and statistic information (or stats) for each flow. Priority may be specified in the flow entry. The OpenFlow switch 300 may process a packet depending on operation information of a flow entry having the highest priority among flow entries having the match information matched with information of a packet.

In this case, a control message collected from the controller 200 at the network anomaly detection device 100 may refer to a message in a control plane, exchanged between the controller 200 and the OpenFlow switch 300. Thus, the control message may include match information, operation information, and statistic information for each flow, included in a flow entry.

The network anomaly detection devices 100 and 101 and the distributed SDN controllers 200 and 201 in the distributed SDN environment according to an embodiment may share the database 500 and the distributed processing instance 700. The database 500 in the specification may refer to a database cluster configured with one or more databases D1 to Dn. The distributed processing instance may mean a computing cluster configured with one or more processing instances C1 to Cn. The inventive concept is not limited by this embodiment. Each of network anomaly detection devices 100 and 101 and distributed SDN controllers 200 and 201 according to another embodiment may include a database and a processing instance.

In other words, the database and the processing instance may be included in the network anomaly detection device and the distributed SDN controller, but may be implemented using another software product such as a distributed database or a file system. Herein, a description will be given of an example in which the one or more distributed SDN controllers 200 and 201 share the database 500 in a cloud environment in the specification.

An exemplary conceptual drawing in which the network anomaly detection device 100 described above is implemented in a distributed SDN environment may be represented as FIG. 1B.

Herein, the above-mentioned network anomaly detection devices 100 and 101 may be shown as Athena which is a framework for detecting an abnormal activity in a distributed network. A feature generator, an attack detector, and an attack reactor which are elements of the Athena may correspond to an application unit, a controller, and a communication unit described below with reference to FIG. 2.

For example, the feature generator may perform a function of collecting a control message from a distributed SDN controller like the communication unit described below with reference to FIG. 2, may perform a function of generating network characteristic information like the controller described below with reference to FIG. 2, and may perform a function of storing network characteristic information in a database like the communication unit described below with reference to FIG. 2. Further, the attack detector may perform a function of generating a network analysis result (a function of detecting malicious behavior) using network characteristic information like the controller described below with reference to FIG. 2. Further, the attack reactor may perform a function of performing alleviation action depending on the network analysis result other than the function of the controller, for generating the network analysis result, described below with reference to FIG. 2.

Figure 2A:
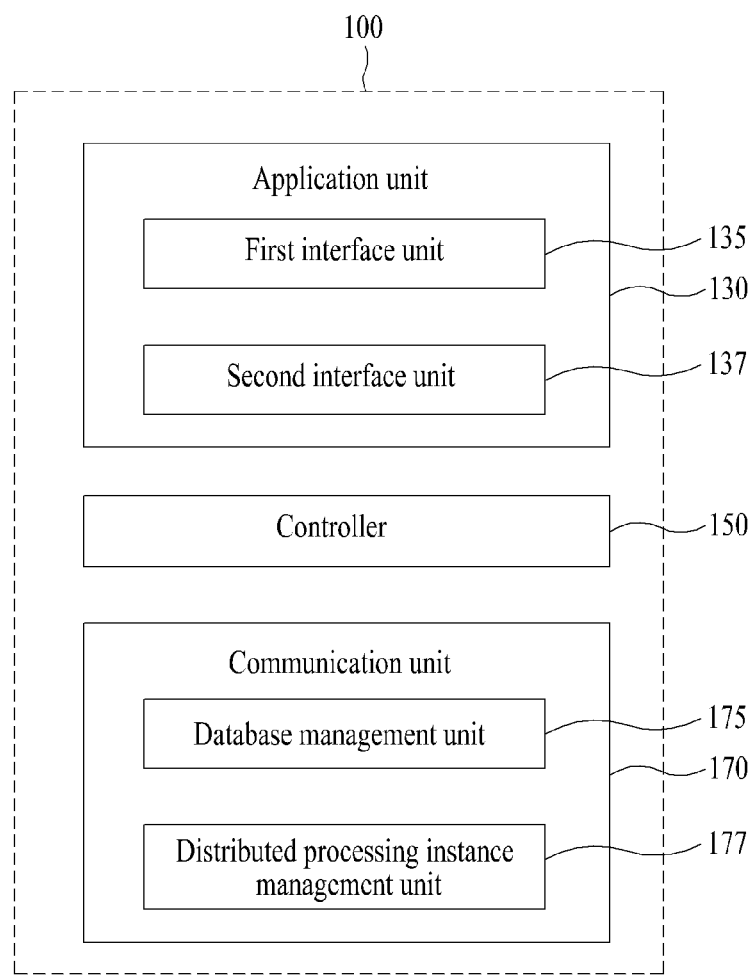
FIG. 2A is a block diagram illustrating a configuration of a network anomaly detection device according to an embodiment and FIG. 2B is an exemplary drawing implementing a network anomaly detection device.
Figure 2B:
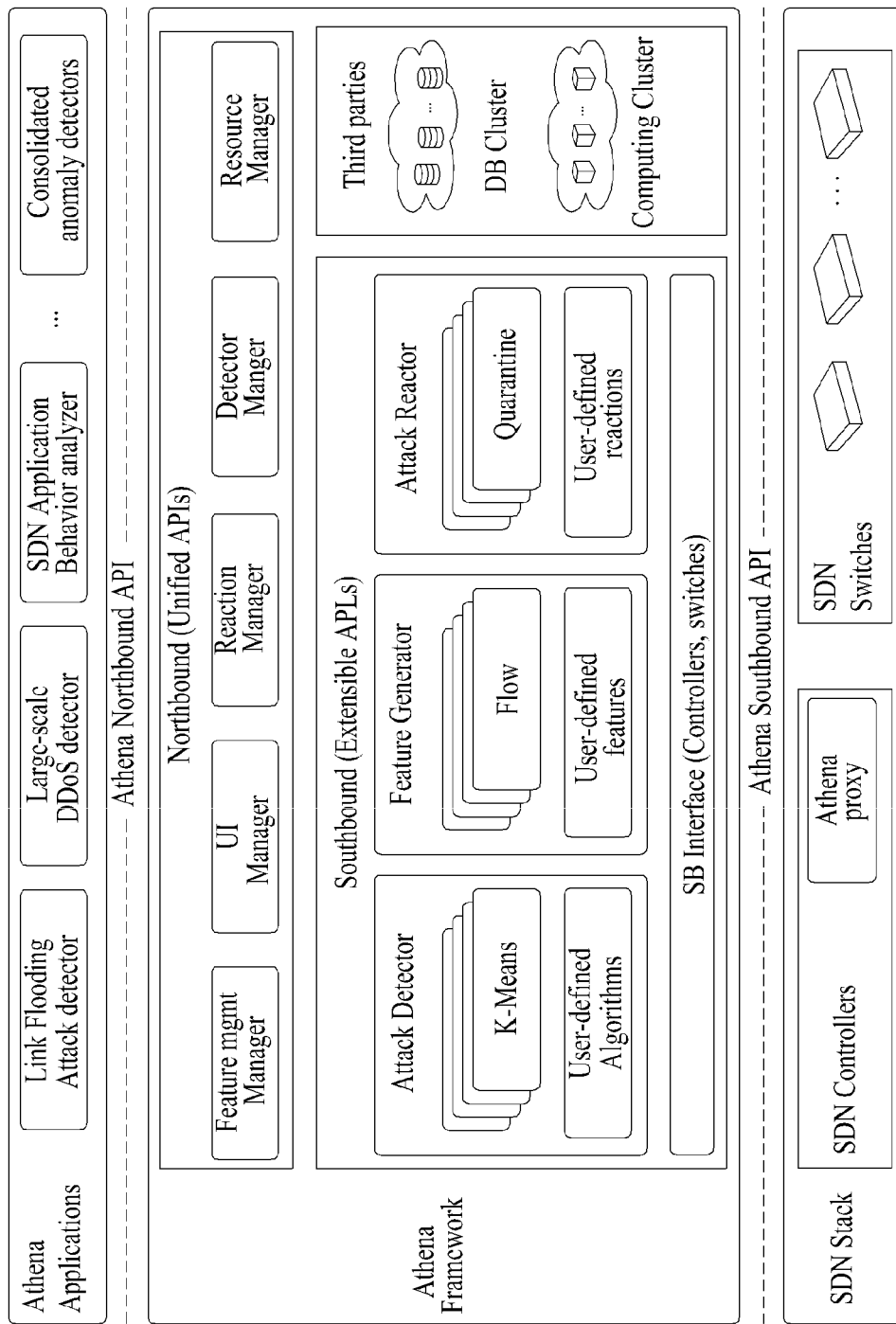

FIG. 2A is a block diagram illustrating a configuration of a network anomaly detection device according to an embodiment and FIG. 2B is an exemplary drawing implementing a network anomaly detection device. Referring to FIG. 2A, a network anomaly detection device 100 according to an embodiment may include an application unit 130, a controller 150, and a communication unit 170. Further, the application unit 130 may include a first interface unit 135 and a second interface unit 137. The communication unit 170 may include a database management unit 175 and a distributed processing instance management unit 177.

First of all, the application unit 130 may receive an operation signal about whether to perform any function from a user and may provide a network analysis result generated by the network anomaly device 100 to the user. If identification information of an application is included in the operation signal, the application unit 130 may provide a network analysis result to the application.

The operation signal received at the application unit 130 may be information input through an application and may include information about whether to perform any function, for example, a network information request signal, a network analysis request signal, a malicious behavior model establishment request signal, an anomaly detection request signal, and the like. The network analysis result provided to the user by the application unit 130 may include network characteristic information, network characteristic information for analysis, a malicious behavior model, and an anomaly detection result.

As an embodiment of the application unit 130, the application unit 130 may receive a network information request signal including identification information of network equipment and identification information of an application from the user. If the controller 150 registers the network information request signal and generates network characteristic information including the identification information of the network equipment as a network analysis result, the application unit 130 may receive the network analysis result from the controller 150 and provide the network analysis result to the user through the application.

As another embodiment if the user requests to analyze a network, the application unit 130 may receive a network analysis request signal including identification information of an application and user request information from the user and may provide the received network analysis request signal to the database management unit 175. If the controller 150 receives network characteristic information for analysis from the database management unit 175 and generates the network characteristic information for analysis as a network analysis result, the application unit 130 may receive the network analysis result from the controller 50 and may provide the network analysis result to the user through the application.

As another embodiment if the user requests to establish a malicious behavior model, if receiving a malicious behavior model establishment request signal from the user, the application unit 130 may transmit the malicious behavior model establishment request signal to the distributed processing instance management unit 177. If the controller 150 receives a malicious behavior model from the distributed processing instance management unit 177 and generates the malicious behavior model as a network analysis result, the application unit 130 may receive the network analysis result from the controller 150 and may provide the network analysis result to the user through the application.

As another embodiment if the user requests to detect anomaly, if receiving an anomaly detection request signal from the user, the application unit 130 may transmit the anomaly detection request signal to the distributed processing instance management unit 177. If the controller 150 receives an anomaly detection result from the distributed processing instance management unit 177 and generates the anomaly detection result as a network analysis result, the application unit 150 may receive the network analysis result from the controller 150 and may provide the network analysis result to the user through the application.

As another embodiment, as shown in FIG. 2A, the application unit 130 may include the first interface unit 135 and the second interface unit 137. The first interface unit 135 may provide a network analysis result to the user via a command line interface (CLI) or a data structure. If the user requests to visualize the network analysis result, the second interface unit 137 may provide the network analysis result to the user through a graphic user interface (GUI).

Further, the application unit 130 may provide a high level API to various user applications of an application layer, for example, a network management application, an attack detection application, a network monitoring application, a notification providing application, a machine learning application, a big data analysis application, and the like. Thus, the user may easily implement a business logic for detecting network anomaly, using the network anomaly detection device 100 according to an embodiment.

The controller 150 may generate network characteristic information using a control message and may generate a network analysis result corresponding to an operation signal using the network characteristic information. The controller 150 may provide the network analysis result corresponding to each operation signal to the application unit 130.

In detail, if the application unit 130 receives a network information request signal including identification information of network equipment and identification information of an application, the controller 150 may register the network information request signal. The registering of the network information request signal may mean that the application is registered with a collector which collects network characteristic information associated with identification information of specific network equipment. The controller 150 may determine whether the identification information of the network equipment is included in network characteristic information. If the identification information of network equipment is included in the network characteristic information as a result of the determination, the controller 150 may generate the network characteristic information as the network analysis result and may transmit the network analysis result to the application unit 130.

As another embodiment of the controller 150, if the application unit 130 receives a network analysis request signal, the controller 150 may receive network characteristic information for analysis from the communication unit 170 may generate the network characteristic information for analysis as a network analysis result, thus transmitting the network analysis result to the application unit 130.

As another embodiment of the controller 150, if the application unit 130 receives a malicious behavior model establishment request signal, the controller 150 may receive a malicious behavior model from the communication unit 170 and may generate the malicious behavior model as a network analysis result, thus transmitting the network analysis result to the application unit 130.

As another embodiment of the controller 150, if the application unit 130 receives an anomaly detection request signal, the controller 150 may receive an anomaly detection result from the communication unit 170 and may generate the anomaly detection result as a network analysis result, thus transmitting the network analysis result to the application unit 130.

The communication unit 170 may collect a control message from a distributed SDN controller 200 of FIG. 1A. As described above, the control message may be a message including match information, operation information, and statistic information for each flow, included in a flow entry. The communication unit 170 may collect a control message received from an OpenFlow switch 300 of FIG. 1A and all control messages which are generated and transmitted to the OpenFlow switch 300 by the distributed SDN controller 200.

If the communication unit 170 collects the control message, as described above, the controller 150 may generate network characteristic information using the control message and may generate a network analysis result corresponding to an operation signal using the network characteristic information. The network characteristic information may include information included in the control message and information derived and combined from the control message and may be a new type of information generated for analyzing and detecting network anomaly after the network anomaly detection device 100 provides information associated with the network anomaly to the user. For example, the network characteristic information may include statistic information and event information included in a control message and new calculation information calculated using the statistic information and the event information.

Further, the network characteristic information may include meaningful network information which may be derived from an OpenFlow protocol, for example, network stateful information depending on a network status, for determining whether any application is associated with a specific flow, how much traffic passes through each flow, whether a flow is used to some degree, and the like.

A format of the network characteristic information according to an embodiment may be represented as Table 1. Details included in each of fields of the network characteristic information may be represented as Table 2.

TABLE 1

| Index | Classi-fication | Metadata | Protocol-Centric | Combination | Stateful (+Variation) |
|---|---|---|---|---|---|

TABLE 2

| Field name | Details |
|---|---|
| Index | Match information included in a control message and identification information of an application |
| Classification | Type information of network characteristic information |
| Metadata | Other additional information (origin, timestamp, and the like of the flow) |
| Protocol-centric | Information directly derived from an SDN control message (e.g., volume such as a packet count and a byte count) |

TABLE 2-continued

| Field name | Details |
|---|---|
| Combination | Information derived and combined from protocol-centric by a predetermined operation expression (e.g., use information for each flow such as the number of packets/duration) |
| Stateful | Stateful information depending on a network status (e.g., pair flows or a pair flow rate of all flows) |

Table 1 may be a format when the network characteristic information is stored as a single entry in a database 500 of FIG. 1A. As shown in Table 2, the network characteristic information may include new calculation information (e.g., a combination field) calculated using information included in a conventional control message and network stateful information depending on a network status as well as information (e.g., a protocol-centric field) included in a control message of a conventional OpenFlow protocol. The network anomaly detection device 100 may analyze and generate more detailed information necessary for detecting network anomaly and may provide the generated information to the user.

Hereinafter, a description will be given in detail of details of each of fields newly defined by network characteristic information according to an embodiment.

An index field may include identification information of an application as well as match information which is identification information about a packet. The identification information of the application may be used as the network anomaly detection device 100 determines whether any application is associated with a specific flow.

A classification field may indicate whether the network characteristic information is any type of information. Since the network characteristic information is information generated using a control message, it may be classified according to a characteristic of the control message. For example, the control message may be divided into a synchronous control message generated on a regular basis and an asynchronous control message generated on an irregular basis. A type of the synchronous control message may be a statistic message for each flow (flow_stats), a statistic message for each port (port_stats), or the like. A type of the asynchronous control message may be a packet-in message, a flow removed message, a port status message, a controller role status message, a table status message, a request forward message, a controller status message, or the like.

A metadata field may include additional information such as a timestamp and a packet payload.

As described above, a protocol-centric field may be information included in a control message and may include statistic information and event information which are directly derived from the control message. The statistic information may be statistic information of a data plane including stats information of a flow entry and may be included in a synchronous control message such as a packet_count and a byte_count. The event information may be information indicating a change in the data plane, such as a port status or an error message, and may be included in an asynchronous control message.

As described above, a combination field may include new calculation information calculated using the statistic information and the event information included in the control message and may be calculated by an operation expression. A user may set a formula to fit his or her need and may newly define new calculation information. The new calculation information may be, for example, flow utilization information indicating the number of packets during a constant period of time, flow capacity information in which the number of all flows is divided by the number of available flows, or the like.

A stateful field may be network stateful information indicating information including a status of an indicator operation depending on a network status and may include information generated from statistic information. For example, the network stateful information may be, for example, a pair flow rate indicating the number of bidirectional connections activated between transmission and reception.

Further, the stateful field may include variation information. The variation information may be new calculation information per unit time or statistic information per unit time and may be generated from a synchronous control message which may be collected on a regular basis. The variation information may be, for example, a packet_count/second, a byte_count/second, or the like.

As such, the network characteristic information may include the new operation information and the network stateful information. Thus, the network anomaly detection device 100 may detect network anomaly based on substantial information about a network status which is difficult to be determined using only a control message of an OpenFlow.

In detail, a description will be given of an example of statistic information and event information of the above-mentioned simple field and an example of new calculation information (e.g., a combination field) and variation information of a rich field with reference to Tables 3 to 6 below. Herein, since the variation information is a value in which each information is divided by a unit time, only whether it is possible to generate variation information from each information may be marked on Tables 3 to 6 below, and a formula may be omitted. A separate description for information defined by an OpenFlow protocol among statistic information and event information described below may be omitted. Since new calculation information is information newly generated according to an embodiment, a description is replaced by describing an operation expression for obtaining each information.

Tables 3 to 6 below are an embodiment of statistic information, event information, new calculation information, and a new calculation information operation expression, which are included in network characteristic information.

TABLE 3

| | | Category | | | |
|---|---|---|---|---|---|
| Classification | Information title | Protocol-centric | Combination | Stateful (+Variation) | Operation expression |
| ERROR | ERRTYPE | √ | | | |
| | ERRCODE | √ | | | |

TABLE 3-continued

| Classification | Information title | Category | | | Operation expression |
|---|---|---|---|---|---|
| | | Protocol-centric | Combination | Stateful (+Variation) | |
| FLOW_REMOVED | REASON | √ | | | |
| | DURATION_SECOND | √ | | | |
| | DURATION_N_SECOND | √ | | | |
| | IDLE_TIMEOUT | √ | | | |
| | HARD_TIMEOUT | √ | | | |
| | PACKET_COUNT | √ | | | |
| | BYTE_COUNT | √ | | | |
| | PACKET_PER_DURATION | | √ | | PACKET_COUNT/ DURATION_N_SEC |
| | BYTE_PER_DURATION | | √ | | BYTE_COUNT/ DURATION_N_SEC |
| PACKET_IN | TOTAL_LEN | √ | | | |
| | REASON | √ | | | |
| | PAYLOAD_MATCHE_FIELDS | √ | | | |
| PORT_STATUS | REASON | | | | √ |

TABLE 4

| Classification | Information title | Category | | | Operation expression |
|---|---|---|---|---|---|
| | | Protocol-centric | Combination | Stateful (+Variation) | |
| FLOW_STATS | DURATION_SEC | √ | | | |
| | DURATION_N_SEC | √ | | | |
| | PRIORITY | √ | | | |
| | IDLE_TIMEOUT | √ | | | |
| | HARD_TIMEOUT | √ | | | |
| | PACKET_COUNT | √ | | √ | |
| | BYTE_COUNT | √ | | √ | |
| | BYTE_PER_PACKET | | √ | | BYTE_COUNT/ PACKET_COUNT |
| | PACKET_PER_DURATION | | √ | | PACKET_COUNT/ DURATION_SEC |
| | BYTE_PER_DURATION | | √ | | BYTE_COUNT /DURATION_SEC |
| | ACTION_OUTPUT | √ | | | |
| | ACTION_OUTPUT_PORT | √ | | | |
| | ACTION_DROP | √ | | | |
| | PAIR_FLOW | | √ | √ | If bidirectional connection |
| | TOTAL_FLOWS | | √ | √ | Σflows |
| | PAIR_FLOW_RATIO | | √ | √ | Σpair_flows/ TOTAL_FLOWS |

50

TABLE 5

| Classification | Information title | Category | | | Operation expression |
|---|---|---|---|---|---|
| | | Protocol-centric | Combination | Stateful (+Variation) | |
| PORT_STATS | RX_PACKETS | √ | | √ | |
| | TX_PACKETS | √ | | √ | |
| | RX_BYTES | √ | | √ | |
| | TX_BYTES | √ | | √ | |
| | RX_DROPPED | √ | | √ | |
| | TX_DROPPED | √ | | √ | |
| | RX_ERRORS | √ | | √ | |
| | TX_ERRORS | √ | | √ | |
| | RX_FRAME_ERROR | √ | | √ | |

TABLE 5-continued

| Classification | Information title | Category | | | Operation expression |
| --- | --- | --- | --- | --- | --- |
| | | Protocol-centric | Combination | Stateful (+Variation) | |
| | RX_OVER_ERROR | √ | | √ | |
| | RX_CRC_ERROR | √ | | √ | |
| | COLLISIONS | √ | | √ | |
| | RX_BYTES_PER_PACKETS | | √ | √ | RX_BYTE/RX_PACKET |
| | TX_BYTES_PER_PACKETS | | √ | √ | TX_BYTE/TX_PACKET |
| | RX_DROPPED_PER_PACKET | | √ | √ | RX_DROPPED/RX_PACKET |
| | TX_DROPPED_PER_PACKET | | √ | √ | TX_DROPPED/TX_PACKET |
| | RX_ERROR_PER_PACKET | | √ | √ | RX_ERROR/RX_PACKET |
| | TX_ERROR_PER_PACKET | | √ | √ | TX_ERROR/TX_PACKET |
| | RX_FRAME_ERROR_PER_PACKET | | √ | √ | RX_FRAME_ERROR/RX_PACKET |
| | RX_OVER_ERROR_PER_PACKET | | √ | √ | RX_OVER_ERROR/RX_PACKET |
| | RX_CRC_ERROR_PER_PACKET | | √ | √ | RX_CRC_ERROR/RX_PACKET |

TABLE 6

| Classification | Information title | Category | | | Operation expression |
| --- | --- | --- | --- | --- | --- |
| | | Protocol-centric | Combination | Stateful (+Variation) | |
| AGGREGATE_STATS | PACKET_COUNT | √ | | √ | |
| | BYTE_COUNT | √ | | √ | |
| | FLOW_COUNT | √ | | √ | |
| | BYTE_PER_PACKET | | √ | √ | BYTE_COUNT/PACKET_COUNT |
| QUEUE_STATS | TX_BYTES | √ | | √ | |
| | TX_PACKETS | √ | | √ | |
| | TX_ERRORS | √ | | √ | |
| TABLE_STATS | MAX_ENTIRES | √ | | √ | |
| | ACTIVE_COUNT | √ | | √ | |
| | LOOKUP_COUNT | √ | | √ | |
| | MATCHED_COUNT | √ | | √ | |
| | MATCHED_PER_LOOKUP | | √ | √ | MATCHED_COUNT/LOOKUP_COUNT |
| | ACTIVE_PER_MAX | | √ | √ | ACTIVE_COUNT/MAX_ENTRIES |
| | LOOKUP_PER_ACTIVE | | √ | √ | LOOKUP_COUNT/ACTIVE_COUNT |
| | MATCHED_PER_ACTIVE | | √ | √ | MATCHED_COUNT/ACTIVE_COUNT |

The communication unit 170 may include the database management unit 175 and the distributed processing instance management unit 177. The database management unit 175 may transmit network characteristic information to the database 500. Further, if the application unit 130 receives a network analysis request signal including identification information of an application and user request information from the user, the database management unit 175 may receive network characteristic information for analysis corresponding to the network analysis request signal from the database 500. In this case, the user request information may include classification information (e.g., a classification field) of network characteristic information specified by the user through an application.

For example, when the user executes a load balance application to analyze a network, the network anomaly detection device 100 may determine the number of packets passing through each switch and may detect network anomaly. In this case, the network anomaly detection device 100 may receive identification information of the load balance application and classification information of network characteristic information the user wants to verify from him or her. Since the user wants to verify the number of packets, he or she may specify and input a packet_count among network characteristic information. If the application unit 130 receives a network analysis request signal including the identification information of the load balance application and the packet_count, the database management unit 175 may transmit the network analysis request signal to the database 500 and may receive network characteristic information for analysis corresponding to the network analysis request signal from the database 500.

The network characteristic information for analysis may refer to only network characteristic information corresponding to the network analysis request signal among all of network characteristic information generated using a control message. Thus, according to the above embodiment, the network characteristic information for analysis may be network characteristic information classified as a packet_count among all the network characteristic information stored in the database 500. If the user further includes identification information of the switch 300 or timestamp information in the network analysis request signal, the database 500 may extract network characteristic information which is matched to the identification information of the switch 300 and the timestamp information and corresponds to a packet_count and may transmit the extracted network characteristic information to the database management unit 175. The network analysis information for analysis transmitted to the database management unit 175 may be provided to the user through the application unit 130 which provides the network characteristic information for analysis to him or her.

If a malicious behavior model establishment request signal is received from the user, the distributed processing instance management unit 177 may transmit the malicious behavior model establishment request signal to the one or more distributed processing instances 700. Receiving the malicious behavior model establishment request signal, the distributed processing instance 700 may call network characteristic information corresponding to the malicious behavior model establishment request signal from the database 500 and may establish a malicious behavior model using the network characteristic information. The distributed processing instance management unit 177 may receive the malicious behavior model from the distributed processing model 700. Herein, the malicious behavior model establishment request signal may include the number of the distributed processing instances 700 which establish the malicious behavior model through machine learning, anomaly behavior detection algorithm information used for the machine learning, and marking information about whether the network characteristic information is malicious information.

Further, if an anomaly detection request signal is received from the user, the distributed processing instance management unit 177 may transmit the anomaly detection request signal to the one or more distributed processing instances 700. The distributed processing instance 700 may call network characteristic information corresponding to the anomaly detection request signal from the database 500 and may derive an anomaly detection result using the network characteristic information. The distributed processing instance management unit 177 may receive the anomaly detection result from the distributed processing instance 700. Herein, the anomaly detection request signal may include the number of distributed processing instances which detect anomaly using the malicious behavior model and anomaly detection target data.

An exemplary drawing implementing the above-mentioned network anomaly detection device 100 may be represented as FIG. 2B.

Herein, the above-mentioned network anomaly detection device 100 is shown as an Athena framework which is a framework which detects an abnormal activity (malicious behavior) in a distributed network. The Athena framework may include a southbound element and a northbound element.

In detail, the southbound element may monitor an SDN control message issued by a data plane through a proxy and may be configured with a southbound interface which performs a function of monitoring an operation of a control plane and a feature generator, an attack detector, and an attack reactor, which perform the above-mentioned function. For example, the feature generator may perform a function of collecting a control message from a distributed SDN controller like the communication unit 170, may perform a function of generating network characteristic information like the controller 150, and perform a function of storing network characteristic information in a database like the communication unit 170. Further, the attack detector may perform a function of generating a network analysis result using network characteristic information (e.g., a function of detecting malicious behavior) like the controller 150. Further, the attack reactor may perform a function of performing an alleviation action depending on a network analysis result other than the function of the controller 150, for generating the network analysis result.

A key function supported by the network anomaly detection device 100 implemented above may be represented as Tables 7 to 9 below. Table 7 is an embodiment indicating a northbound API of the network anomaly detection device 100. Table 8 is an embodiment indicating a parameter of a northbound API. Table 9 is an embodiment indicating a function supported for each parameter of Table 8.

TABLE 7

| Function | Details |
| --- | --- |
| RequestFeatures(q) | Request a set of Athena features with user-defined constraints including feature re-organization |
| ManageMonitor(q, 0) | Turn on/off a network monitoring including a feature generation |
| GenerateDetectionModel(q, f, a) | Generate anomaly detection model according to an user-defined algorithm and features |
| ValidateFeatures(q, f, m) | Validate a set of Athena features with a generated detection model |
| AddEventHandler(q) | Register an event handler to retrieve features from Athena according to user-defined constraints |
| AddOnlineValidator(f, m, e) | Register an online validator to examine an incoming feature in an online manner |
| Reactor(q, r) | Enforced actions to the data plane |
| ShowResults(r') | Display the results from Athena with a graphical interface |

TABLE 8

| Parameter | Details |
| --- | --- |
| Query(q) | Unified query to retrieve Athena features with constraints |
| Preprocessor(f) | Preprocessing statement to re-design features |
| Algorithm(a) | Description of an algorithm including parameters of the algorithm |

TABLE 8-continued

| Parameter | Details |
| --- | --- |
| Model(m) | Generated detection model |
| Results(r') | Results of a validation or a feature request |
| Event Handler(e) | Event handler to receive online Athena events |
| Reactions(r) | Reactions for handling suspicious hosts |
| Operations(o) | Flags for a network monitoring per features |

TABLE 9

| Query(q) | Operator |
| --- | --- |
| Arithmetic | >, >=, ==, !=, <=, < |
| Relationship | and, or |
| Options | Sorting, Aggregation, Limiting |

| Preprocessor(f) | Details |
| --- | --- |
| Weighting | Emphasize certain features |
| Sampling | Select a subset from entire features |
| Normalization | Standardize the range of independent variables |
| Marking | Mark certain features as a malicious entry |

| Algorithm(a) | Supported algorithms |
| --- | --- |
| Boosting | Gradient Boosted Tree |
| Classification | Decision Tree, Logistic Regression, Naive Bayes, Random Forest, SVM |
| Clustering | Gaussian Mixture, K-Means |
| Regression | Lasso, Linear, Ridge |
| Simple | Threshold |

| Reactions(r) | Details |
| --- | --- |
| Block | Block target hosts |
| Quarantine | Isolate hosts in honeynets |

| Operations(o) | Details |
| --- | --- |
| True | Turn on network monitoring |
| False | Turn off network monitoring |

Hereinafter, a description will be given of a network anomaly detection method and a computer program stored in a medium to execute each operation of the network anomaly detection method according to an embodiment with reference to FIGS. 3 to 6.

Figure 3:
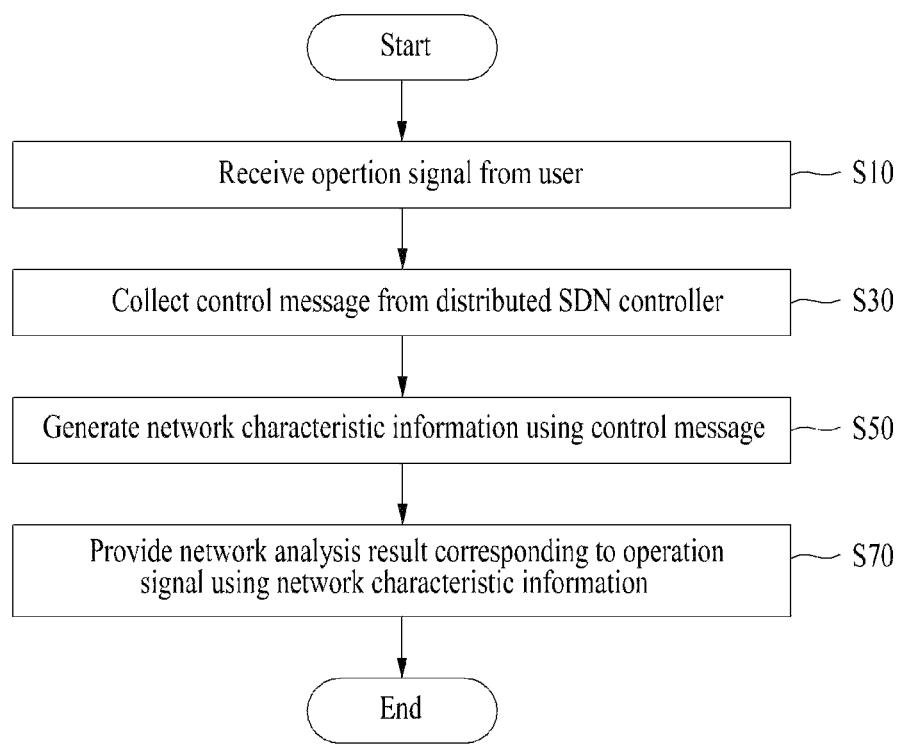
FIG. 3 is a flowchart illustrating a network anomaly detection method according to an embodiment.

First of all, referring to FIG. 3, in operation S10 of the network anomaly detection method according to an embodiment, an operation signal about whether to perform any function may be received from a user. In operation S30, a control message may be collected from a distributed SDN controller. In operation S50, network characteristic information may be generated using the control message. Herein, the network characteristic information may include statistic information or event information included in the control message, new calculation information calculated using the statistic information or the event information, and network stateful information. Further, the network characteristic information may include statistic information per unit time or new calculation information per unit time. In addition, since details for the network characteristic information are described above, they may be omitted. In operation S70, a network analysis result corresponding to the operation signal may be provided using the network characteristic information.

Figure 4:
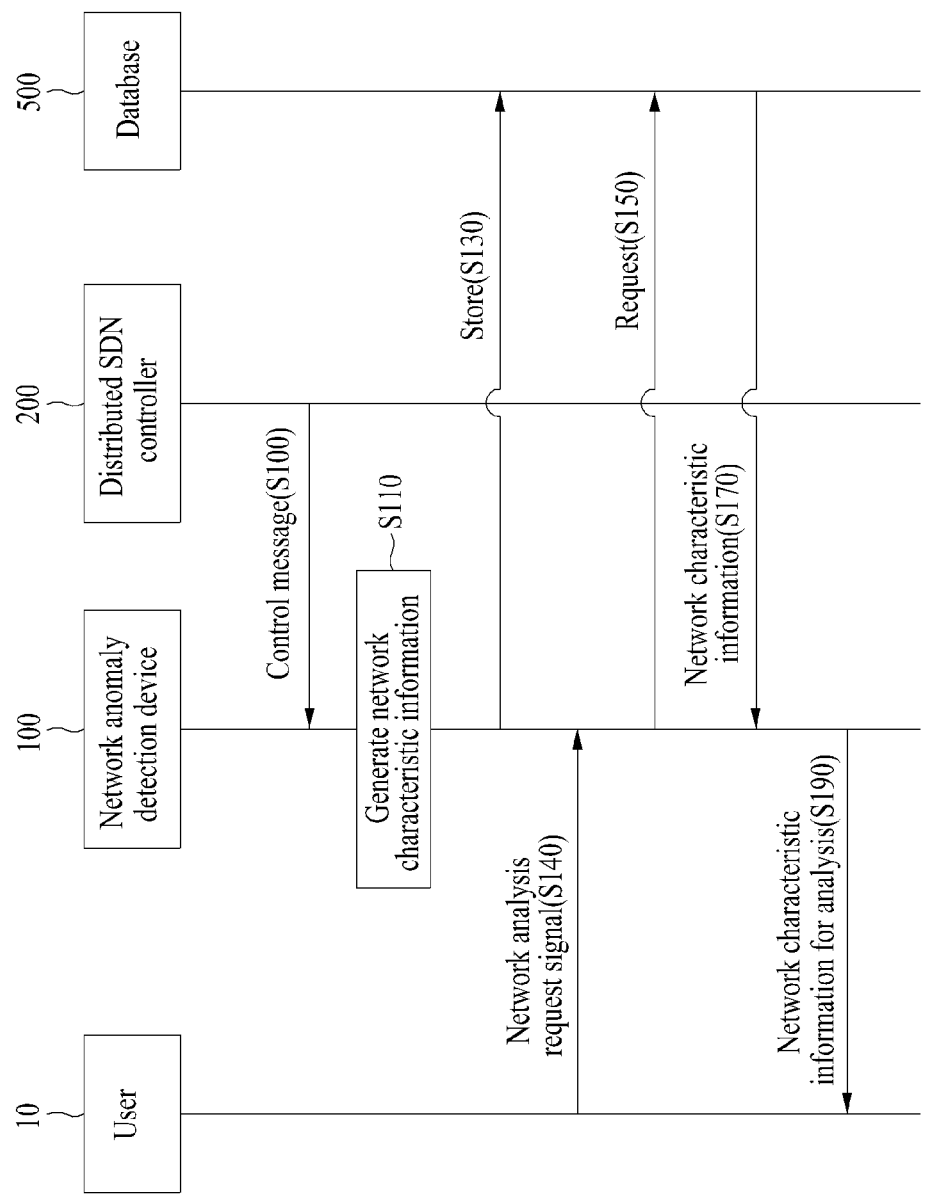
FIG. 4 is a signal sequence diagram illustrating a network anomaly detection method according to an embodiment.

Referring to FIG. 4, in operation S100, a network anomaly detection device 100 may collect a control message from a distributed SDN controller 200. In operation S110, the network anomaly detection device 100 may generate network characteristic information using the control message. In operation S130, the generated network characteristic information may be stored in a database 500. If receiving a network analysis request signal including identification information of an application and user request information from a user 10 in operation S140, in operation S150, the network anomaly detection device 100 may request the database 500 to transmit network characteristic information for analysis corresponding to the network analysis request signal. If receiving the network analysis information for analysis corresponding to the network analysis request signal from the database 500 in operation S170, in operation S190, the network anomaly detection device 100 may provide the network characteristic information for analysis to the user 10 through the application. Herein, the user request information may include classification information of network characteristic information specified by the user through the application. In operation S190 of providing the network characteristic information for analysis, the network characteristic information for analysis may be provided to the user 10 via a CLI or a data structure. If the user 10 requests to visualize the network characteristic information for analysis, the network anomaly detection device 100 may provide the network characteristic information for analysis to the user 10 through a GUI.

Considering an embodiment in which the user executes a load balance application and detects network anomaly, if he or she executes the load balance application and specifies a packet count as user request information, a network analysis request signal may further include identification information of network equipment and timestamp information. Network characteristic information for analysis may be packet count information corresponding to identification information of network equipment, identification information of an application, timestamp information.

Figure 5:
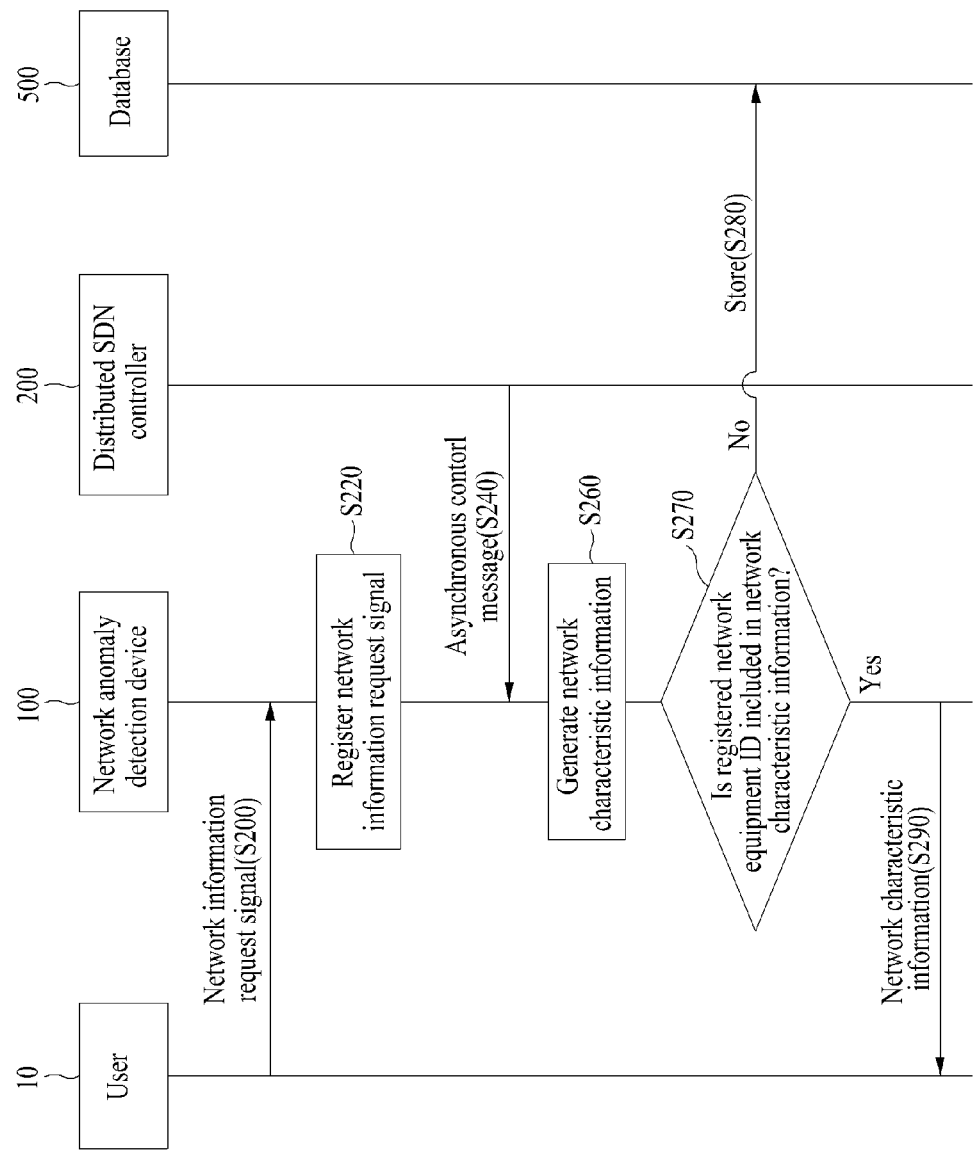
FIG. 5 is a signal sequence diagram illustrating a network anomaly detection method according to another embodiment.

Referring to FIG. 5, in the network anomaly detection method according to an embodiment, the user 10 may register a network information request signal in the network anomaly detection device 100. If identification information of network equipment, included in the network information request signal, is included in network characteristic information generated by collecting a control message from the distributed SDN controller 200, the network anomaly detection device 200 may provide the network characteristic information to the user 10.

In detail, if receiving a network information request signal including identification information of network equipment and identification information of an application in operation S200, in operation S220, the network anomaly detection device 100 may register the network information request signal. In operation S240, the network anomaly detection device 100 may collect a control message from the distributed SDN controller 200. In operation S260, the network anomaly detection device 100 may generate network characteristic information using the control message. If the network characteristic information is generated, in operation S270, the network anomaly detection device 100 may determine whether the identification information of the network equipment is included in the network characteristic information. If the identification information of the network equipment is included in the network characteristic information as a result of the determination, in operation S290, the network anomaly detection device 100 may provide the network characteristic information to the user 10 through an application. If the network characteristic information does not include the identification information of the network equipment, in operation S280, the network anomaly detection device 100 may store the generated network characteristic information in the database 500.

Referring to FIG. 6, the network anomaly detection method according to an embodiment may be performed in an order of establishing a malicious behavior model, analyzing whether anomaly is detected by comparing network characteristic information to be analyzed with the malicious behavior model, and providing the anomaly detection result to a user. The malicious behavior model may refer to a reference model for determining whether malicious behavior is any behavior. The establishing of the malicious behavior and the analyzing whether the anomaly is detected may be performed by an external distributed processing instance 700. Network characteristic information substantially used to establish the malicious behavior and analyze whether the anomaly is detected may be previously stored in the database 500.

In more detail, if receiving a malicious behavior model establishment request signal from the user 10 in operation S300, in operation S310, the network anomaly detection device 100 may transmit the malicious behavior model establishment request signal to the one or more distributed processing instances 700. In operation S330, the distributed processing instances 700 may request the database 500 to transmit network characteristic information corresponding to the malicious behavior model establishment request signal. In operation S350, the distributed processing instance 700 may receive the network characteristic information from the database 500. In operation S370, the distributed processing instance 700 may establish a malicious behavior model using the network characteristic information. In operation S380, the network anomaly detection device 100 may receive the malicious behavior model from the distributed processing instance 700. In operation S390, the network anomaly detection device 100 may provide the received malicious behavior model to the user 10. Herein, the malicious behavior model establishment request signal may include the number of distributed processing instances which establish the malicious behavior model through machine learning, anomaly detection algorithm information used for the machine learning, and marking information about whether network characteristic information is malicious information.

In operation S370 of establishing the malicious behavior model may be performed through the machine learning using algorithm information included in the malicious behavior model establishment request signal. A clustering algorithm such as a K-means algorithm, a PCB-based anomaly detection algorithm, a support vector machine (SVM) algorithm, or the like may be used as a machine learning algorithm for detecting an abnormal activity of a network. The anomaly detection algorithm information may include algorithm selection information about whether to use any algorithm and a parameter value for each algorithm. For example, if the user wants to establish a malicious behavior model using the K-means algorithm, the anomaly detection algorithm information may include the number of clustering which is a parameter of the K-means algorithm, the number of times of repetition, or the like.

Further, the malicious behavior model establishment request signal may include indexing information about how grouping network characteristic information is performed upon establishing a malicious behavior model. The grouping may refer to a task of redefining an entry by grouping a plurality of network characteristic information having the same identification information among identification information included in an index field into one group when a malicious behavior model is established. For example, identification information of an application and identification information of a switch may be included in an index field of each of the plurality of network characteristic information. If the user sets the identification information of the application and the identification information of the switch to indexing information, network characteristic information, such as the identification information of the application and the identification information of the switch, may be regarded as being the same as each other among a large amount of network characteristic information.

Further, the malicious behavior model establishment request signal may include marking information about whether network characteristic information is malicious information. The marking information may be information for marking whether network characteristic information corresponding to a network is malicious information to establish a malicious behavior model. A distributed processing instance may establish a malicious behavior model using a network characteristic information data set including the marking information.

A description will be given of a method for detecting network anomaly using the established malicious behavior model with reference to FIG. 6. If receiving an anomaly detection request signal from the user 10 in operation S400, the network anomaly detection device 100 may transmit the anomaly detection request signal to the one or more distributed processing instances 700. In operation S430, the distributed processing instances 700 may request the database 500 to transmit network characteristic information corresponding to the anomaly detection request signal. If receiving the network characteristic information corresponding to the anomaly detection request signal from the database 500 in operation S450, in operation S470, the distributed processing instance 700 may analyze whether anomaly is detected using the network characteristic information and may derive the anomaly detection result. If receiving the anomaly detection result derived from the distributed processing instance in operation S480, in operation S490, the network anomaly detection device 100 may provide the anomaly detection result to the user 10. Herein, the anomaly detection request signal may include the number of distributed processing instances which detect anomaly using a malicious behavior model and anomaly detection target data. The anomaly detection target data may be network characteristic information of a network which is a target of anomaly detection and may be network characteristic information or network characteristic information for analysis, dynamically collected after the user registers a network information request signal in the anomaly detection device 100.

A description will be given of the establishing of the malicious behavior model and the network anomaly detection method through an embodiment in which the user uses a distributed denial of service (DDOS) attack detection application. If the user uses the DDOS attack detection application, he or she transmits a network analysis request signal to the network anomaly detection device 100 to establish a malicious behavior model to request data generated in a test environment. In this case, user request information included in the network analysis request signal may be a timestamp. Further, the user may include additional information about an entry in the user request information. The network anomaly detection device 100 may receive network characteristic information for analysis corresponding to the network analysis request signal from the database 500 and may request the distributed processing instance 700 to transmit the network characteristic information for analysis. The network anomaly detection device 100 may transmit network characteristic information for analysis, generated in a test environment, and algorithm information received from the user, that is, algorithm selection information about whether to use any algorithm and a parameter value for an algorithm to the distributed processing instance 700 to request to establish a malicious behavior model. The network anomaly detection device 100 may generate statistic information based on additional information. The network anomaly detection device 100 may provide a malicious behavior model and additional statistic information to the user. If the user transmits an anomaly detection request signal including anomaly detection target data to the network anomaly detection device 100, the network anomaly detection device 100 transmits this anomaly detection request signal to the distributed processing instance 700 such that the distributed processing instance 700 analyzes whether the anomaly detection target data is abnormal. In other words, the network anomaly detection device 100 may allow the distributed processing algorithm 700 to insert each of a plurality of network characteristic information corresponding to anomaly detection target data into a malicious behavior model and detect malice. The network anomaly detection device 100 may receive an anomaly detection result from the distributed processing instance 700, may transmit the anomaly detection result and statistic information to the user, and may store the anomaly detection result and the statistic information in the database 500.

A description will be given of the establishing of the malicious behavior model and the network anomaly detection method through an embodiment in which the user uses a link flooding attack (LFA) alleviation application. If the user uses the LFA alleviation application, he or she may receive link usage for measuring link use and changed details for each flow to distinguish an attacker, using the network anomaly detection device 100. Herein, sine the network anomaly detection device 100 provides a plurality of characteristic information based on various volumes, such as a threshold value, including changed details for each flow, a plurality of candidate characteristic information may be defined. Thus, the network anomaly detection device 100 may detect and alleviate received events by calling an AddEventHandler API through an event handler. In this case, an LFA detection logic including flooding detection based on a lightweight threshold value for measuring a volume for each port is implemented in an event handler. Thus, the network anomaly detection device 100 may block a doubtful host based on a detected result.

A description will be given of the establishing of the malicious behavior model and the network anomaly detection method through an embodiment in which the user uses a network application effectiveness (NAE) problem detection application. If the user uses the NAE problem detection application, he or she may search for a flow related network function for each application and may analyze whether information given by Check_SLA( ) conforms to a service level agreement (SLA) 2 by calling an AddEventHandler API using the network anomaly detection device 100. Thus, if a received event conforms to SLA, the network anomaly detection device 100 may call a ResultsGenerator utility API and may generate result to notify operations. Thus, the network anomaly detection device 100 may report an abnormal activity on a GUI through a ShowResults API.

Each operation of the above-mentioned network anomaly detection method may be executed through a computer program stored in a medium.

According to an embodiment, the method, apparatus, and computer program for detecting network anomaly may enhance scalability and availability of a network anomaly detection framework by allowing the user to easily verify and analyze a large amount of network status data collected in the distributed SDN environment.

Further, the method, apparatus, and computer program for detecting network anomaly may increase utilization by supporting a variety of functions for detecting network anomaly as compared with the related art and providing a high level API to the user.

Further, the method, apparatus, and computer program for detecting network anomaly may enhance distribution properties by using an OpenFlow without change without customizing a switch.

Further, the method, apparatus, and computer program for detecting network anomaly may use abnormal activity detection characteristic information suitable for each attack by deriving various types of network characteristic information necessary for detecting an abnormal activity in a conventional OpenFlow environment.

Further, the method, apparatus, and computer program for detecting network anomaly may ensure scalability in a large-scale network by configuring a fully-distributed architecture of constructing functions, such as an anomaly detection algorithm, a storage, and collection of network characteristic information, necessary for an abnormal activity as a distributed environment.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for detecting network anomaly in a distributed software defined networking (SDN) environment, the method comprising:
    receiving an operation signal about whether to perform any function from a user;
    collecting a control message from a distributed SDN controller;
    generating a network characteristic information using the control message; and
    providing a network analysis result corresponding to the operation signal using the network characteristic information,
    wherein the network characteristic information comprises statistic information or event information included in the control message, new calculation information calculated using the statistic information or the event information, and network stateful information;
    storing the network characteristic information in a database,
    wherein the receiving of the operation signal comprises:
    receiving a network analysis request signal including identification information of an application and user request information from the user,
    wherein the providing of the network analysis result comprises:
    receiving network characteristic information for analysis corresponding to the network analysis request signal from the database; and
    providing the network characteristic information for analysis to the user through the application, and wherein the user request information comprises classification information of network characteristic information specified by the user through the application, the classification information comprising a packet count, which is matched to an identification information of a switch and a timestamp information and corresponds to the packet count, wherein the new calculation information includes flow capacity information in which the number of all flows is divided by the number of available flows, wherein the network stateful information includes a pair of flow rate indicating the number of bidirectional connections activated between transmission and reception and variation information indicating a packet count per unit time or a byte count per unit time.

2. The method of claim 1, wherein the receiving of the operation signal comprises:
receiving a network information request signal including identification information of network equipment and identification information of an application from the user, and
wherein the providing of the network analysis result comprises:
registering the network information request signal;
if the network characteristic information is generated, determining whether the identification information of the network equipment is included in the network characteristic information; and
if the identification information of the network equipment is included in the network characteristic information as a result of the determination, providing the network characteristic information to the user through the application.

3. The method of claim 1, further comprising:
storing the network characteristic information in a database,
wherein the receiving of the operation signal comprises:
receiving a malicious behavior model establishment request signal from the user,
wherein the providing of the network analysis result comprises:
transmitting the malicious behavior model establishment request signal to one or more distributed processing instances;
if the distributed processing instance calls network characteristic information corresponding to the malicious behavior model establishment request signal from the database and establishes a malicious behavior model using the network characteristic information, receiving the malicious behavior model from the distributed processing instance; and
providing the malicious behavior model to the user, and
wherein the malicious behavior model establishment request signal comprises the number of distributed processing instances which establish the malicious behavior model through machine learning, anomaly detection algorithm information used for the machine learning, and marking information about whether the network characteristic information is malicious information.

4. The method of claim 3, wherein the receiving of the operation signal further comprises:
receiving an anomaly detection request signal from the user,
wherein the providing of the network analysis result further comprises:
transmitting the anomaly detection request signal to the one or more distributed processing instances; and
if the distributed processing instance calls network characteristic information corresponding to the anomaly detection request signal from the database and derives an anomaly detection result using the network characteristic information, receiving the anomaly detection result from the distributed processing instance and providing the anomaly detection result to the user, and
wherein the anomaly detection request signal comprises the number of distributed processing instances which detect anomaly using the malicious behavior model and anomaly detection target data.

5. The method of claim 1, wherein the providing of the network analysis result comprises:
providing the network analysis result to the user via a command line interface (CLI) or a data structure; and
if the user requests to visualize the network analysis result, providing the network analysis result to the user via a graphical user interface (GUI).

* * * * *